United States Patent
Ihlenburg et al.

(10) Patent No.: US 11,285,873 B2
(45) Date of Patent: *Mar. 29, 2022

(54) METHOD FOR GENERATING SURROUND VIEW IMAGES DERIVED FROM IMAGE DATA CAPTURED BY CAMERAS OF A VEHICULAR SURROUND VIEW VISION SYSTEM

(71) Applicant: MAGNA ELECTRONICS INC., Auburn Hills, MI (US)

(72) Inventors: Joern Ihlenburg, Berlin (DE); Goerg Pflug, Weil der Stadt (DE); Achim Gieseke, Gross-Umstadt (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/948,879

(22) Filed: Oct. 5, 2020

(65) Prior Publication Data
US 2021/0016709 A1    Jan. 21, 2021

Related U.S. Application Data

(63) Continuation of application No. 14/233,508, filed as application No. PCT/US2012/048110 on Jul. 25, 2012, now Pat. No. 10,793,067.
(Continued)

(51) Int. Cl.
*B60R 1/00* (2006.01)
*H04N 13/257* (2018.01)
(Continued)

(52) U.S. Cl.
CPC .............. *B60R 1/00* (2013.01); *G06T 15/205* (2013.01); *H04N 13/239* (2018.05);
(Continued)

(58) Field of Classification Search
None
See application file for complete search history.

(56) References Cited

U.S. PATENT DOCUMENTS

| 4,491,390 A | 1/1985 | Tong-Shen |
| 4,512,637 A | 4/1985 | Ballmer |

(Continued)

FOREIGN PATENT DOCUMENTS

| DE | 3248511 A1 | 7/1984 |
| DE | 4107965 A1 | 9/1991 |

(Continued)

OTHER PUBLICATIONS

Bow, Sing T., "Pattern Recognition and Image Preprocessing (Signal Processing and Communications)", CRC Press, Jan. 15, 2002, pp. 557-559.

(Continued)

*Primary Examiner* — Kaitlin A Retallick
(74) *Attorney, Agent, or Firm* — Honigman LLP

(57) ABSTRACT

A method for generating surround view images derived from image data captured by cameras of a vehicular surround view vision system includes equipping a vehicle with a plurality of cameras disposed at the vehicle. Image data is captured by the cameras and provided to a control of the vehicle. The provided captured image data is processed to generate a first three-dimensional representation in accordance with a first curved surface model as if seen by a virtual observer from a first virtual viewing point exterior of the vehicle having a first viewing direction. The first representation is output to a display screen of the vehicle for display to the driver of the vehicle. Responsive to actuation of a user input, the processing is adjusted to generate a second three-
(Continued)

dimensional representation in accordance with a second curved surface model, and the second representation is output to the display screen.

16 Claims, 11 Drawing Sheets

Related U.S. Application Data

(60) Provisional application No. 61/511,738, filed on Jul. 26, 2011.

(51) Int. Cl.
*H04N 13/324* (2018.01)
*G06T 15/20* (2011.01)
*H04N 13/239* (2018.01)

(52) U.S. Cl.
CPC ......... *H04N 13/257* (2018.05); *H04N 13/324* (2018.05); *B60R 2300/602* (2013.01); *B60R 2300/607* (2013.01); *B60R 2300/70* (2013.01)

(56) References Cited

U.S. PATENT DOCUMENTS

| | | |
|---|---|---|
| 4,521,804 A | 6/1985 | Bendell |
| 4,529,275 A | 7/1985 | Ballmer |
| 4,529,873 A | 7/1985 | Ballmer et al. |
| 4,532,550 A | 7/1985 | Bendell et al. |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger et al. |
| 4,580,875 A | 4/1986 | Bechtel et al. |
| 4,600,913 A | 7/1986 | Caine |
| 4,603,946 A | 8/1986 | Kato et al. |
| 4,614,415 A | 9/1986 | Hyatt |
| 4,620,141 A | 10/1986 | McCumber et al. |
| 4,623,222 A | 11/1986 | Itoh et al. |
| 4,626,850 A | 12/1986 | Chey |
| 4,629,941 A | 12/1986 | Ellis et al. |
| 4,630,109 A | 12/1986 | Barton |
| 4,632,509 A | 12/1986 | Ohmi et al. |
| 4,638,287 A | 1/1987 | Umebayashi et al. |
| 4,645,975 A | 2/1987 | Meitzler et al. |
| 4,647,161 A | 3/1987 | Muller |
| 4,653,316 A | 3/1987 | Fukuhara |
| 4,669,825 A | 6/1987 | Itoh et al. |
| 4,669,826 A | 6/1987 | Itoh et al. |
| 4,671,615 A | 6/1987 | Fukada et al. |
| 4,672,457 A | 6/1987 | Hyatt |
| 4,676,601 A | 6/1987 | Itoh et al. |
| 4,690,508 A | 9/1987 | Jacob |
| 4,692,798 A | 9/1987 | Seko et al. |
| 4,697,883 A | 10/1987 | Suzuki et al. |
| 4,701,022 A | 10/1987 | Jacob |
| 4,713,685 A | 12/1987 | Nishimura et al. |
| 4,717,830 A | 1/1988 | Botts |
| 4,727,290 A | 2/1988 | Smith et al. |
| 4,731,669 A | 3/1988 | Hayashi et al. |
| 4,731,769 A | 3/1988 | Schaefer et al. |
| 4,741,603 A | 5/1988 | Miyagi et al. |
| 4,758,883 A | 7/1988 | Kawahara et al. |
| 4,768,135 A | 8/1988 | Kretschmer et al. |
| 4,772,942 A | 9/1988 | Tuck |
| 4,789,904 A | 12/1988 | Peterson |
| 4,793,690 A | 12/1988 | Gahan et al. |
| 4,817,948 A | 4/1989 | Simonelli |
| 4,820,933 A | 4/1989 | Hong et al. |
| 4,825,232 A | 4/1989 | Howdle |
| 4,833,534 A | 5/1989 | Paff et al. |
| 4,838,650 A | 6/1989 | Stewart et al. |
| 4,847,772 A | 7/1989 | Michalopoulos et al. |
| 4,855,822 A | 8/1989 | Narendra et al. |
| 4,859,031 A | 8/1989 | Berman et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux et al. |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,900,133 A | 2/1990 | Berman |
| 4,907,870 A | 3/1990 | Brucker |
| 4,910,591 A | 3/1990 | Petrossian et al. |
| 4,917,477 A | 4/1990 | Bechtel et al. |
| 4,937,796 A | 6/1990 | Tendler |
| 4,953,305 A | 9/1990 | Van Lente et al. |
| 4,961,625 A | 10/1990 | Wood et al. |
| 4,966,441 A | 10/1990 | Conner |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,987,410 A | 1/1991 | Berman et al. |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,050,966 A | 9/1991 | Berman |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,075,768 A | 12/1991 | Wirtz et al. |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam et al. |
| 5,166,681 A | 11/1992 | Bottesch et al. |
| 5,168,378 A | 12/1992 | Black |
| 5,170,374 A | 12/1992 | Shimohigashi et al. |
| 5,172,235 A | 12/1992 | Wilm et al. |
| 5,172,317 A | 12/1992 | Asanuma et al. |
| 5,177,606 A | 1/1993 | Koshizawa |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield et al. |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |

(56) References Cited

U.S. PATENT DOCUMENTS

| | | |
|---|---|---|
| 5,343,206 A | 8/1994 | Ansaldi et al. |
| 5,351,044 A | 9/1994 | Mathur et al. |
| 5,355,118 A | 10/1994 | Fukuhara |
| 5,359,666 A | 10/1994 | Nakayama et al. |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,408,346 A | 4/1995 | Trissel et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,559,695 A | 9/1996 | Daily |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,638,116 A | 6/1997 | Shimoura et al. |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,684 A | 3/1999 | Millikan et al. |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,904,725 A | 5/1999 | Iisaka et al. |
| 5,914,815 A | 6/1999 | Bos |
| 5,920,367 A | 7/1999 | Kajimoto et al. |
| 5,923,027 A | 7/1999 | Stam et al. |
| 5,959,367 A | 9/1999 | O'Farrell et al. |
| 5,959,555 A | 9/1999 | Furuta |
| 5,963,247 A | 10/1999 | Banitt |
| 5,964,822 A | 10/1999 | Alland et al. |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,009,336 A | 12/1999 | Harris et al. |
| 6,020,704 A | 2/2000 | Buschur |
| 6,049,171 A | 4/2000 | Stam et al. |
| 6,052,124 A | 4/2000 | Stein et al. |
| 6,066,933 A | 5/2000 | Ponziana |
| 6,072,903 A | 6/2000 | Maki et al. |
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,116,743 A | 9/2000 | Hoek |
| 6,139,172 A | 10/2000 | Bos et al. |
| 6,144,022 A | 11/2000 | Tenenbaum et al. |
| 6,158,655 A | 12/2000 | DeVries, Jr. et al. |
| 6,175,164 B1 | 1/2001 | O'Farrell et al. |
| 6,175,300 B1 | 1/2001 | Kendrick |
| 6,198,409 B1 | 3/2001 | Schofield et al. |
| 6,201,642 B1 | 3/2001 | Bos |
| 6,226,061 B1 | 5/2001 | Tagusa |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,291,906 B1 | 9/2001 | Marcus et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,359,392 B1 | 3/2002 | He |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |

(56) References Cited

U.S. PATENT DOCUMENTS

| | | |
|---|---|---|
| 6,424,273 B1 | 7/2002 | Gulla et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,442,465 B2 | 8/2002 | Breed et al. |
| 6,477,464 B2 | 11/2002 | McCarthy et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek |
| 6,515,378 B2 | 2/2003 | Drummond et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,559,435 B2 | 5/2003 | Schofield et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,565 B2 | 7/2003 | Heslin et al. |
| 6,593,698 B2 | 7/2003 | Stam et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,691,464 B2 | 2/2004 | Nestell et al. |
| 6,693,524 B1 | 2/2004 | Payne |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjonell |
| 6,757,109 B2 | 6/2004 | Bos |
| 6,762,867 B2 | 7/2004 | Lippert et al. |
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,807,287 B1 | 10/2004 | Hermans |
| 6,822,563 B2 | 11/2004 | Bos et al. |
| 6,823,241 B2 | 11/2004 | Shirato et al. |
| 6,824,281 B2 | 11/2004 | Schofield et al. |
| 6,847,487 B2 | 1/2005 | Burgner |
| 6,864,930 B2 | 3/2005 | Matsushita et al. |
| 6,882,287 B2 | 4/2005 | Schofield |
| 6,889,161 B2 | 5/2005 | Winner et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 7,004,593 B2 | 2/2006 | Weller et al. |
| 7,004,606 B2 | 2/2006 | Schofield |
| 7,038,577 B2 | 5/2006 | Pawlicki et al. |
| 7,046,448 B2 | 5/2006 | Burgner |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,103,212 B2 | 9/2006 | Hager et al. |
| 7,113,867 B1 | 9/2006 | Stein |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,167,796 B2 | 1/2007 | Taylor et al. |
| 7,195,381 B2 | 3/2007 | Lynam et al. |
| 7,202,776 B2 | 4/2007 | Breed |
| 7,224,324 B2 | 5/2007 | Quist et al. |
| 7,227,459 B2 | 6/2007 | Bos et al. |
| 7,227,611 B2 | 6/2007 | Hull et al. |
| 7,253,723 B2 | 8/2007 | Lindahl et al. |
| 7,307,655 B1 * | 12/2007 | Okamoto ............ G06K 9/00791 348/222.1 |
| 7,311,406 B2 | 12/2007 | Schofield et al. |
| 7,338,177 B2 | 3/2008 | Lynam |
| 7,370,983 B2 | 5/2008 | DeWind et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,423,821 B2 | 9/2008 | Bechtel et al. |
| 7,425,076 B2 | 9/2008 | Schofield et al. |
| 7,502,049 B2 | 3/2009 | Aichi et al. |
| 7,541,743 B2 | 6/2009 | Salmeen et al. |
| 7,565,006 B2 | 7/2009 | Stam et al. |
| 7,566,851 B2 | 7/2009 | Stein et al. |
| 7,605,856 B2 | 10/2009 | Imoto |
| 7,619,508 B2 | 11/2009 | Lynam et al. |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,720,580 B2 | 5/2010 | Higgins-Luthman |
| 7,786,898 B2 | 8/2010 | Stein et al. |
| 7,792,329 B2 | 9/2010 | Schofield et al. |
| 7,843,451 B2 | 11/2010 | Lafon |
| 7,855,778 B2 | 12/2010 | Yung et al. |
| 7,859,565 B2 | 12/2010 | Schofield et al. |
| 7,930,160 B1 | 4/2011 | Hosagrahara et al. |
| 7,949,486 B2 | 5/2011 | Denny et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,164,628 B2 | 4/2012 | Stein et al. |
| 8,179,236 B2 | 5/2012 | Weller et al. |
| 8,189,871 B2 | 5/2012 | Camilleri et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,452,055 B2 | 5/2013 | Stein et al. |
| 8,553,088 B2 | 10/2013 | Stein et al. |
| 10,793,067 B2 | 10/2020 | Ihlenburg et al. |
| 2001/0002451 A1 | 5/2001 | Breed |
| 2002/0005778 A1 | 1/2002 | Breed et al. |
| 2002/0011611 A1 | 1/2002 | Huang et al. |
| 2002/0113873 A1 | 8/2002 | Williams |
| 2002/0130953 A1 | 9/2002 | Riconda et al. |
| 2003/0085999 A1 | 5/2003 | Okamoto et al. |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0105580 A1 | 6/2004 | Hager et al. |
| 2004/0164228 A1 | 8/2004 | Fogg et al. |
| 2005/0219852 A1 | 10/2005 | Stam et al. |
| 2005/0237385 A1 | 10/2005 | Kosaka et al. |
| 2006/0015554 A1 | 1/2006 | Umezaki et al. |
| 2006/0018511 A1 | 1/2006 | Stam et al. |
| 2006/0018512 A1 | 1/2006 | Stam et al. |

(56) References Cited

U.S. PATENT DOCUMENTS

| | | |
|---|---|---|
| 2006/0091813 A1 | 5/2006 | Stam et al. |
| 2006/0103727 A1 | 5/2006 | Tseng |
| 2006/0125921 A1 | 6/2006 | Foote |
| 2006/0250501 A1 | 11/2006 | Wildmann et al. |
| 2006/0268360 A1* | 11/2006 | Jones ............... H04N 5/23238 358/448 |
| 2007/0024724 A1 | 2/2007 | Stein et al. |
| 2007/0041659 A1 | 2/2007 | Nobori et al. |
| 2007/0104476 A1 | 5/2007 | Yasutomi et al. |
| 2007/0236595 A1 | 10/2007 | Pan et al. |
| 2007/0242339 A1 | 10/2007 | Bradley |
| 2008/0012879 A1 | 1/2008 | Clodfelter |
| 2008/0043099 A1 | 2/2008 | Stein et al. |
| 2008/0056607 A1* | 3/2008 | Ovsiannikov ........... G06T 5/002 382/275 |
| 2008/0147321 A1 | 6/2008 | Howard et al. |
| 2008/0170803 A1 | 7/2008 | Forutanpour |
| 2008/0192132 A1 | 8/2008 | Bechtel et al. |
| 2008/0212189 A1 | 9/2008 | Baur et al. |
| 2008/0266396 A1 | 10/2008 | Stein |
| 2009/0022422 A1 | 1/2009 | Sorek et al. |
| 2009/0113509 A1 | 4/2009 | Tseng et al. |
| 2009/0153549 A1 | 6/2009 | Lynch et al. |
| 2009/0160987 A1 | 6/2009 | Bechtel et al. |
| 2009/0167564 A1* | 7/2009 | Long-Tai ........... B62D 15/0285 340/932.2 |
| 2009/0175492 A1 | 7/2009 | Chen et al. |
| 2009/0190015 A1 | 7/2009 | Bechtel et al. |
| 2009/0256938 A1 | 10/2009 | Bechtel et al. |
| 2009/0290032 A1 | 11/2009 | Zhang et al. |
| 2010/0017047 A1* | 1/2010 | Sanders-Reed ........... G06F 3/14 701/3 |
| 2010/0134325 A1 | 6/2010 | Gomi et al. |
| 2010/0194890 A1 | 8/2010 | Weller et al. |
| 2011/0001826 A1* | 1/2011 | Hongo ................. B60R 1/00 348/148 |
| 2011/0032357 A1 | 2/2011 | Kitaura et al. |
| 2011/0122249 A1 | 5/2011 | Camilleri et al. |
| 2011/0156887 A1 | 6/2011 | Shen et al. |
| 2011/0175752 A1 | 7/2011 | Augst |
| 2011/0193961 A1* | 8/2011 | Peterson ............... H04N 7/183 348/148 |
| 2011/0216201 A1 | 9/2011 | McAndrew et al. |
| 2012/0045112 A1 | 2/2012 | Lundblad et al. |
| 2012/0069185 A1 | 3/2012 | Stein |
| 2012/0162427 A1 | 6/2012 | Lynam |
| 2012/0200707 A1 | 8/2012 | Stein et al. |
| 2012/0314071 A1 | 12/2012 | Rosenbaum et al. |
| 2012/0320209 A1 | 12/2012 | Vico et al. |
| 2013/0141580 A1 | 6/2013 | Stein et al. |
| 2013/0147957 A1 | 6/2013 | Stein |
| 2013/0169812 A1 | 7/2013 | Lu et al. |
| 2013/0286193 A1 | 10/2013 | Pflug |
| 2014/0043473 A1 | 2/2014 | Gupta et al. |
| 2014/0063254 A1 | 3/2014 | Shi et al. |
| 2014/0098229 A1 | 4/2014 | Lu et al. |
| 2014/0247352 A1 | 9/2014 | Rathi et al. |
| 2014/0247354 A1 | 9/2014 | Knudsen |
| 2014/0320658 A1 | 10/2014 | Pliefke |
| 2014/0333729 A1 | 11/2014 | Pflug |
| 2014/0347486 A1 | 11/2014 | Okouneva |
| 2014/0350834 A1 | 11/2014 | Turk |
| 2015/0022664 A1 | 1/2015 | Pflug et al. |
| 2015/0049193 A1 | 2/2015 | Gupta et al. |

FOREIGN PATENT DOCUMENTS

| | | |
|---|---|---|
| DE | 4124654 A1 | 1/1993 |
| EP | 0202460 A2 | 11/1986 |
| EP | 0353200 A2 | 1/1990 |
| EP | 0361914 A2 | 4/1990 |
| EP | 0450553 A2 | 10/1991 |
| EP | 0492591 A1 | 7/1992 |
| EP | 0513476 A1 | 11/1992 |
| EP | 0527665 A1 | 2/1993 |
| EP | 0605045 A1 | 7/1994 |
| EP | 0640903 A1 | 3/1995 |
| EP | 0697641 A2 | 2/1996 |
| EP | 1022903 A2 | 7/2000 |
| EP | 1065642 A2 | 1/2001 |
| EP | 1074430 A1 | 2/2001 |
| EP | 1115250 A1 | 7/2001 |
| EP | 1170173 A2 | 1/2002 |
| EP | 2377094 A1 | 10/2011 |
| GB | 2233530 A | 1/1991 |
| JP | S5539843 A | 3/1980 |
| JP | 58110334 | 6/1983 |
| JP | 59114139 | 7/1984 |
| JP | 6080953 | 5/1985 |
| JP | 6079889 | 10/1986 |
| JP | 6216073 B2 | 4/1987 |
| JP | 6272245 | 5/1987 |
| JP | 62131837 | 6/1987 |
| JP | 6414700 | 1/1989 |
| JP | 01123587 | 5/1989 |
| JP | H1168538 A | 7/1989 |
| JP | H236417 | 8/1990 |
| JP | H2117935 A | 9/1990 |
| JP | 03099952 | 4/1991 |
| JP | 04114587 | 4/1992 |
| JP | 04239400 | 8/1992 |
| JP | 0577657 | 3/1993 |
| JP | 05050883 | 3/1993 |
| JP | 05213113 | 8/1993 |
| JP | 06107035 | 4/1994 |
| JP | 6227318 B2 | 8/1994 |
| JP | 06267304 | 9/1994 |
| JP | 06276524 | 9/1994 |
| JP | 06295601 | 10/1994 |
| JP | 07004170 | 1/1995 |
| JP | 0732936 | 2/1995 |
| JP | 0747878 | 2/1995 |
| JP | 07052706 | 2/1995 |
| JP | 0769125 | 3/1995 |
| JP | 07105496 | 4/1995 |
| JP | H730149 | 6/1995 |
| JP | 2630604 | 7/1997 |
| JP | 200274339 A | 3/2002 |
| JP | 200383742 A | 3/2003 |
| JP | 20041658 A | 1/2004 |
| WO | 1996021581 A1 | 7/1996 |
| WO | 2010099416 A1 | 9/2010 |
| WO | 2011028686 A1 | 3/2011 |
| WO | 2012075250 A1 | 6/2012 |

OTHER PUBLICATIONS

Broggi et al., "Multi-Resolution Vehicle Detection using Artificial Vision," IEEE Intelligent Vehicles Symposium of Jun. 2004.

Brown, A Survey of Image Registration Techniques, vol. 24, ACM Computing Surveys, pp. 325-376, 1992.

Burger et al., "Estimating 3-D Egomotion from Perspective Image Sequences", IEEE Transactions on Pattern Analysis and Machine Intelligence, vol. 12, No. 11, pp. 1040-1058, Nov. 1990.

Donnelly Panoramic Vision™ on Renault Talisman Concept Car At Frankfort MotorShow, PR Newswire, Frankfort, Germany Sep. 10, 2001.

Greene et al., Creating Raster Omnimax Images from Multiple Perspective Views Using the Elliptical Weighted Average Filter, IEEE Computer Graphics and Applications, vol. 6, No. 6, pp. 21-27, Jun. 1986.

International Search Report and Written Opinion dated Oct. 1, 2012 from corresponding PCT Application No. PCT/US2012/048110.

Lu, M., et al. On-chip Automatic Exposure Control Technique, Solid-State Circuits Conference, 1991. ESSCIRC '91. Proceedings—Seventeenth European (vol. 1) with abstract.

Porter et al., "Compositing Digital Images," Computer Graphics (Proc. SIGGRAPH), vol. 18, No. 3, pp. 253-259, Jul. 1984.

Pratt, "Digital Image Processing, Passage—ED.3", John Wiley & Sons, US, Jan. 1, 2001, pp. 657-659, XP002529771.

(56) References Cited

OTHER PUBLICATIONS

Szeliski, Image Mosaicing for Tele-Reality Applications, DEC Cambridge Research Laboratory, CRL 94/2, May 1994.
Wolberg, "A Two-Pass Mesh Warping Implementation of Morphing," Dr. Dobb's Journal, No. 202, Jul. 1993.
Wolberg, Digital Image Warping, IEEE Computer Society Press, 1990.

* cited by examiner

FIG. 1
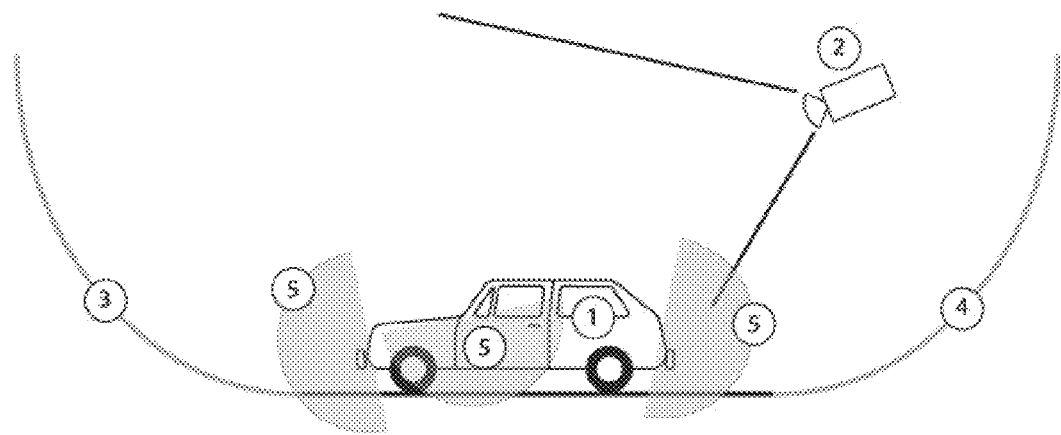
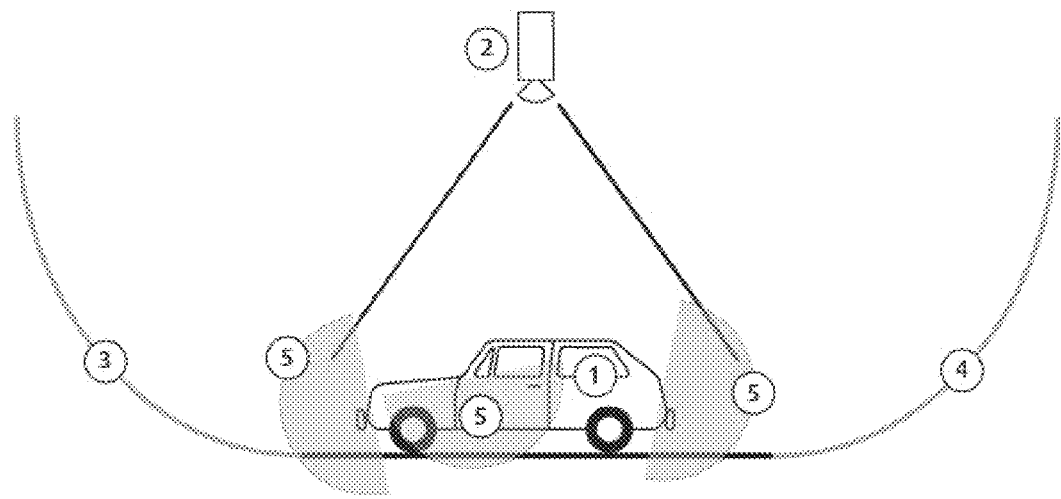
FIG. 2

FIG. 3
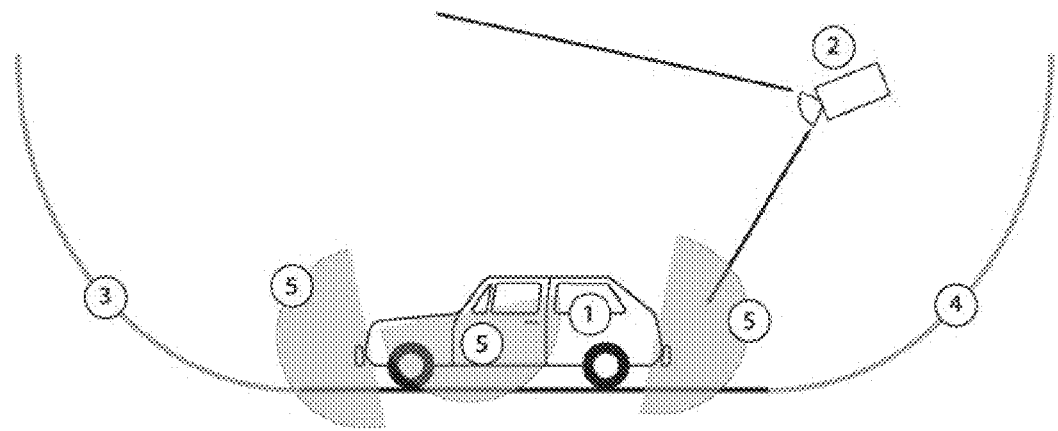
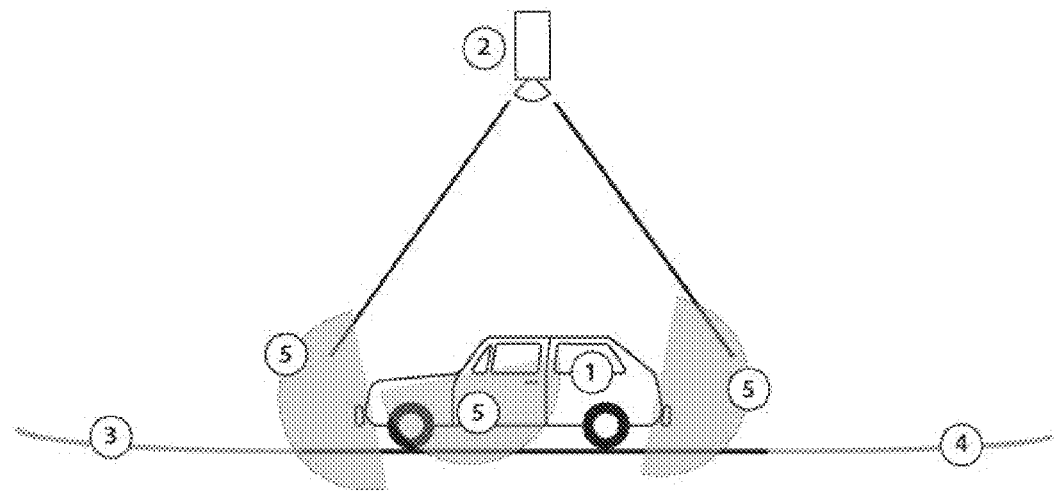
FIG. 4

METHOD FOR GENERATING SURROUND VIEW IMAGES DERIVED FROM IMAGE DATA CAPTURED BY CAMERAS OF A VEHICULAR SURROUND VIEW VISION SYSTEM

CROSS REFERENCE TO RELATED APPLICATIONS

The present application is a continuation of U.S. patent application Ser. No. 14/233,508, filed Jan. 17, 2014, now U.S. Pat. No. 10,793,067, which is a 371 national phase filing of PCT Application No. PCT/US2012/048110, filed Jul. 25, 2012, which claims the filing benefits of U.S. provisional application Ser. No. 61/511,738, filed Jul. 26, 2011, which is hereby incorporated herein by reference in its entirety.

FIELD OF THE INVENTION

The present invention relates to imaging systems or vision systems for vehicles and, more particularly, to a vision system that includes a plurality of imaging devices or cameras for capturing images exteriorly of the vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Vision systems or imaging systems for a vehicle that utilize a plurality of cameras to capture images exterior of the vehicle and a display for displaying a virtual image of the subject vehicle and its surroundings for viewing by a driver of the vehicle are known.

SUMMARY OF THE INVENTION

The present invention provides a vision system or imaging systems for a vehicle that utilizes a plurality of cameras to capture images exterior of the vehicle and a display for displaying a virtual image of the subject vehicle and its surroundings for viewing by a driver of the vehicle having a processing system that is operable to process image data into a three-dimensional space model for display at a display screen as if seen from a first virtual viewing point exterior of the vehicle and at a first viewing angle and to adjust the three-dimensional space model when providing a second virtual viewing point exterior of the vehicle and at a second viewing angle to provide enhanced display of the images as if seen from the second virtual viewing point. Thus, the system may provide a more realistic virtual display from various selected virtual viewpoints exterior of the subject or equipped vehicle.

Optionally, the system may include a processing system that is operable to store raw image data in a main memory device to reduce an amount of data to be moved to the memory device. The processing system accesses and processes blocks of data and the processing of the blocks of data comprises at least one of (a) de-mosaic processing of said image data to convert to RGB, YUV or YCrCb color space, (b) visibility enhancement processing and (c) merging of image data from two or more of said imaging sensors. Thus, such "pre-processing" of image data is only done on the selected data to reduce the amount of data that is moved to the memory of the vision system.

Optionally, the system may include a processing system that is operable to transform image data to produce a view of the exterior area surrounding the vehicle, with the processing system selecting a portion of the transformed image data for transmitting to the display screen for displaying images at the display screen. Responsive to an indication that information outside of the selected portion of the transformed image data is to be displayed on the display screen, the processing system selects another portion of the image data and transmits the other portion of the image data for displaying images at the display screen. Thus, the system provides for reduced bandwidth requirements by transmitting only the data necessary or appropriate for providing the desired or selected or appropriate image display.

These and other objects, advantages, purposes and features of the present invention will become apparent upon review of the following specification in conjunction with the drawings.

BRIEF DESCRIPTION OF THE DRAWINGS

FIG. 1 is a schematic of a vehicle with a vision system and imaging sensors or cameras that provide a virtual image display of the subject vehicle, with the virtual image being generated based on a virtual view point rearward and above the subject vehicle;

FIG. 2 is a schematic of the vehicle and vision system of FIG. 1, showing a virtual image generated based on a virtual view point generally centrally above the subject vehicle;

FIGS. 3 and 4 are schematics similar to FIGS. 1 and 2, but FIG. 4 shows how a virtual projection surface is adapted for different virtual viewpoints in accordance with the present invention;

DESCRIPTION OF THE PREFERRED EMBODIMENTS

Figure 5:
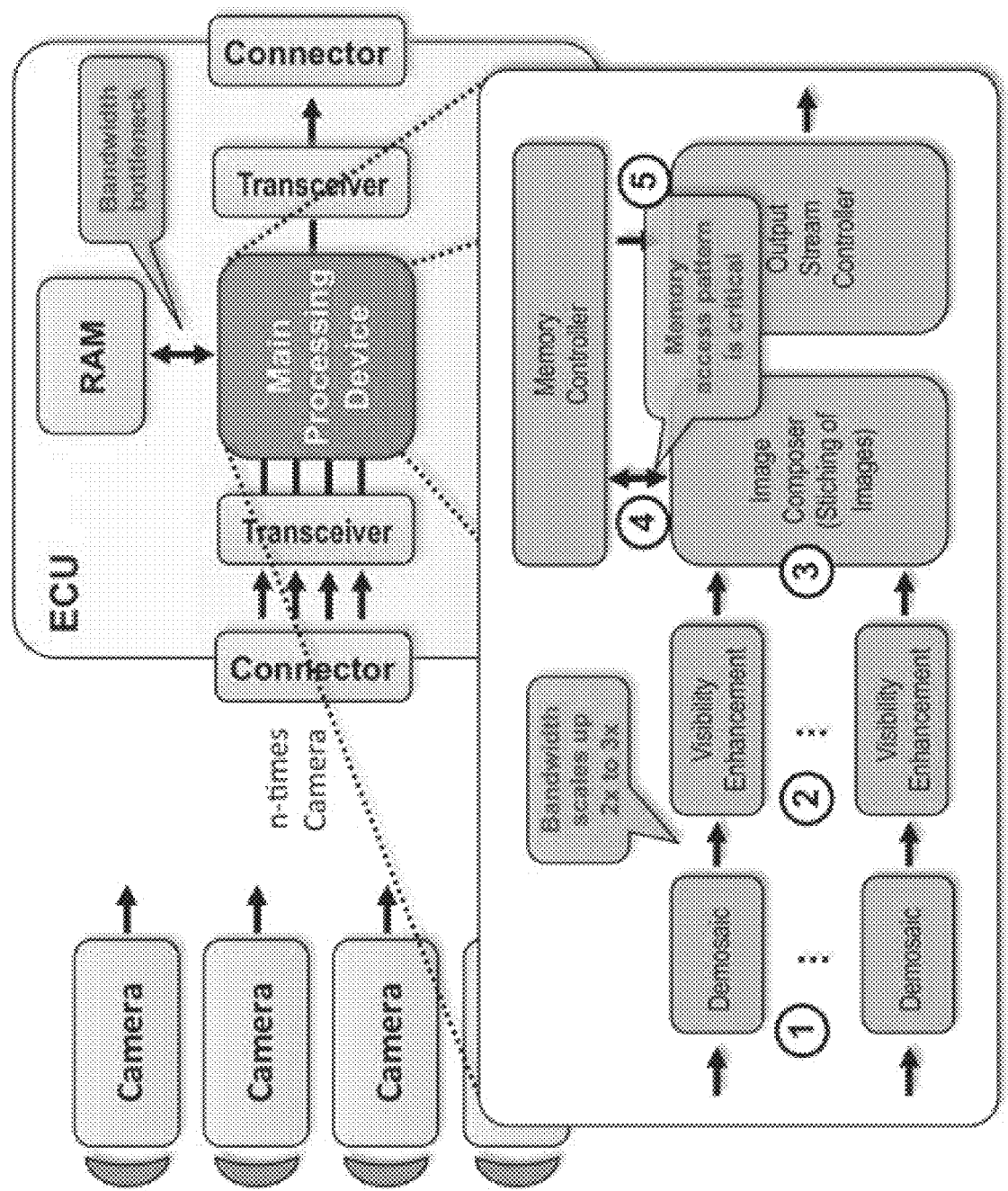
FIG. 5 is a schematic of a multi-camera image processing system for processing image data captured by multiple cameras at a vehicle.

Referring now to the drawings and the illustrative embodiments depicted therein, a vehicle 1 includes an imaging system or vision system that includes a plurality of imaging sensors or cameras 5 (such as at the front, rear and sides of the vehicle), which capture images exterior of the vehicle (FIGS. 1 and 2).

Adaptive 3D Display Geometry for Different Virtual Viewing Angles:

In order for a driver of a vehicle to visually check an environment around the driver's vehicle, there are systems that allow the driver to look at the situation around the driver's vehicle 1 by combining and converting image data captured by a plurality of vehicle-mounted cameras (or environmental sensors) 5 into a three-dimensional space model 3, 4 that can be viewed at a display as if seen from an arbitrary virtual viewing point 2, with the display of the virtual image being made on a display screen inside of the vehicle, such as at a video display screen at or in an interior rearview mirror assembly. If a three-dimensional shape made up of curved and flat surfaces 3, 4 is used as a model on which the camera images are being projected (such as the image generation device does in FIG. 1), the advantage is that it is possible to view not only an overhead image of a vehicle but also an arbitrary view of the vehicle from the outside the vehicle, such as shown for example at 2 in FIG. 2. This is accomplished by placing a so called "virtual" camera 2 (or virtual viewpoint) inside of the three-dimensional shape or model or curved surface model or mapping surface or plane 3, 4 and displaying an image from the several image sources which may be stitched to one on a 360 degree display screen inside of the vehicle as if the displayed image were captured by the virtual camera 2.

However, if this virtual camera is set to a new viewpoint (such as shown in FIG. 2), the geometry where the original camera images are being projected on might not be appropriate to provide a natural looking impression of the surroundings of the vehicle. As can be seen with reference to FIGS. 3 and 4, the images captured by a plurality of vehicle-mounted cameras 5 are projected on a number of curved surfaces 3, 4 that together form some sort of geometry. A virtual camera 2 is placed inside this geometry and so that an image can be shown on a screen (mapping plane) attached to the system that gives the impression as if a real camera were hovering around the vehicle (such as disclosed in U.S. provisional application Ser. No. 61/602,878, filed Feb. 24, 2012 and entitled VEHICLE VISION SYSTEM WITH FREE POSITIONAL VIRTUAL PANORAMIC VIEW, and/or U.S. provisional application Ser. No. 61/615,410, filed Mar. 26, 2012 and entitled VEHICLE VISION SYSTEM WITH CUSTOMIZED DISPLAY, which are hereby incorporated herein by reference in their entireties). In order to give a natural looking impression of that virtual view as the view point may be adjusted to provide different information to the driver of the vehicle, the curved surfaces may be adjusted to accommodate a selected viewpoint or virtual camera location. For example, and as can be seen with reference to FIGS. 3 and 4, the curved display surfaces may be flattened towards a ground plane the more the virtual camera 2 is looking top down at the vehicle (in other words, a flatter display surface or mapping surface is used as the virtual camera is moved towards a more top-down directed viewing position).

The present invention thus provides a vision or imaging system that comprises and utilizes a plurality of imaging sensors or cameras disposed at a vehicle, with each camera having a respective exterior field of view and each camera capturing respective image data. A display screen is disposed in the vehicle and operable to display images for viewing by a driver of the vehicle. The display screen is operable to display images derived from image data captured by the imaging sensors. A processing system is operable to process image data captured by the imaging sensors and to combine and/or manipulate the image data (such as by manipulating image data captured by each image sensor and combining the image data captured by the sensors) to provide a three-dimensional representation of the exterior scene for display at the display screen. The processing system is operable to process the captured image data in accordance with a curved surface model. The processing system is operable to process the image data so that the three-dimensional representation is displayed at the display screen as if seen by a virtual observer from a first virtual viewing point exterior of the vehicle having a first viewing direction. The processing system is operable to adjust the curved surface model when the system displays the three-dimensional representation from a second virtual viewing point exterior of the vehicle having a second viewing direction to provide enhanced display of the images as if viewed from the second virtual viewing point. The second virtual viewing point and second viewing direction may be selected by the driver of the vehicle to provide a desired display or virtual viewpoint or the second virtual viewing point and second viewing direction may be automatically controlled or selected responsive to an input, such as responsive to shifting the vehicle to a reverse gear or the like or selection, in order to provide an appropriate display/view to the driver of the vehicle. Optionally, for example, a first virtual viewing point may be generally above the vehicle with a substantially horizontal first viewing direction, whereby the curved surface model may have substantially curved surfaces around the vehicle, and a second virtual viewing point may be generally above the vehicle with a substantially vertical or top-down second viewing direction, whereby the processing system may adjust the curved surface model to have substantially planar surfaces.

The adjusting of the curved display surface or surfaces or three dimensional model or mapping surface or curved surface model may happen in a reciprocal dependency of the viewing angle of the virtual camera towards the ground. This means that the curvature of the mapping plane or surface becomes maximized or increased when the camera is viewing horizontal and becomes minimized or reduced (i.e., becomes flatter) when looking straight top down onto the ground. The dependency may be controlled according these equations, which may fully or partially embodied into the system's algorithm:

$$\vec{a} = \begin{pmatrix} x \\ y \\ z \end{pmatrix}; \vec{a}'_y = \frac{\vec{a}}{|\vec{a}|} \cdot \vec{e}_y; y \leq 0; \quad (1)$$

$$y_{plane} = \vec{a}'_y \left( \sqrt{(x^2 + (z \cdot 3)^2)} - d \right)^2 \text{ for: } \left( \sqrt{x^2 + (z \cdot 3)^2} - d \right) > 0; \quad (2)$$

$$y_{plane} = 0 \quad \text{for: } \left( \sqrt{(x^2 + (z \cdot 3)^2)} - d \right) \leq 0; \quad (3)$$

wherein $\vec{a}$ is the viewing direction vector of the virtual camera, $\vec{e}_z$ and $\vec{e}_x$ are the horizontal normal vectors (ground plane), $\vec{e}_y$ is the vertical normal vector (upright direction), $\vec{a}'_y$ is the vertical vector component of $\vec{a}$, d is the distance from the origin, and $y_{plane}$ is the resulting height of a projection planes spot f (d, $\vec{a}'_y$). The coordinate systems origin is in the center on the bottom.

Figure 10:
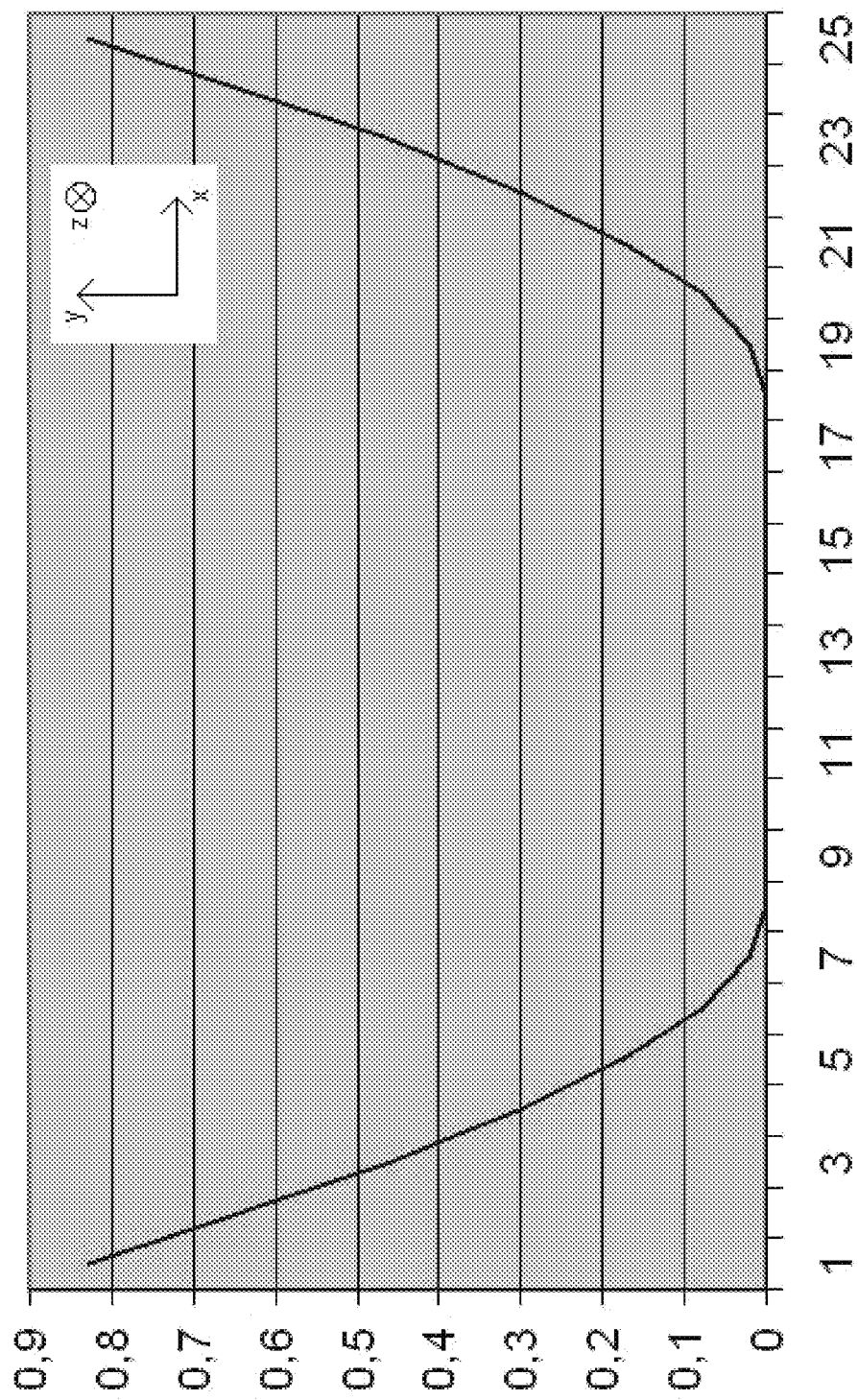
FIG. 10 is a plot of a square parabola curvature function with its minimum stretched by a discontinuous section which is used as a hull curve of image projection planes of a multi-camera image processing and display system in accordance with the present invention (such as can be seen as a cross cut through the center of the 3D projection screen model)
Figure 11:
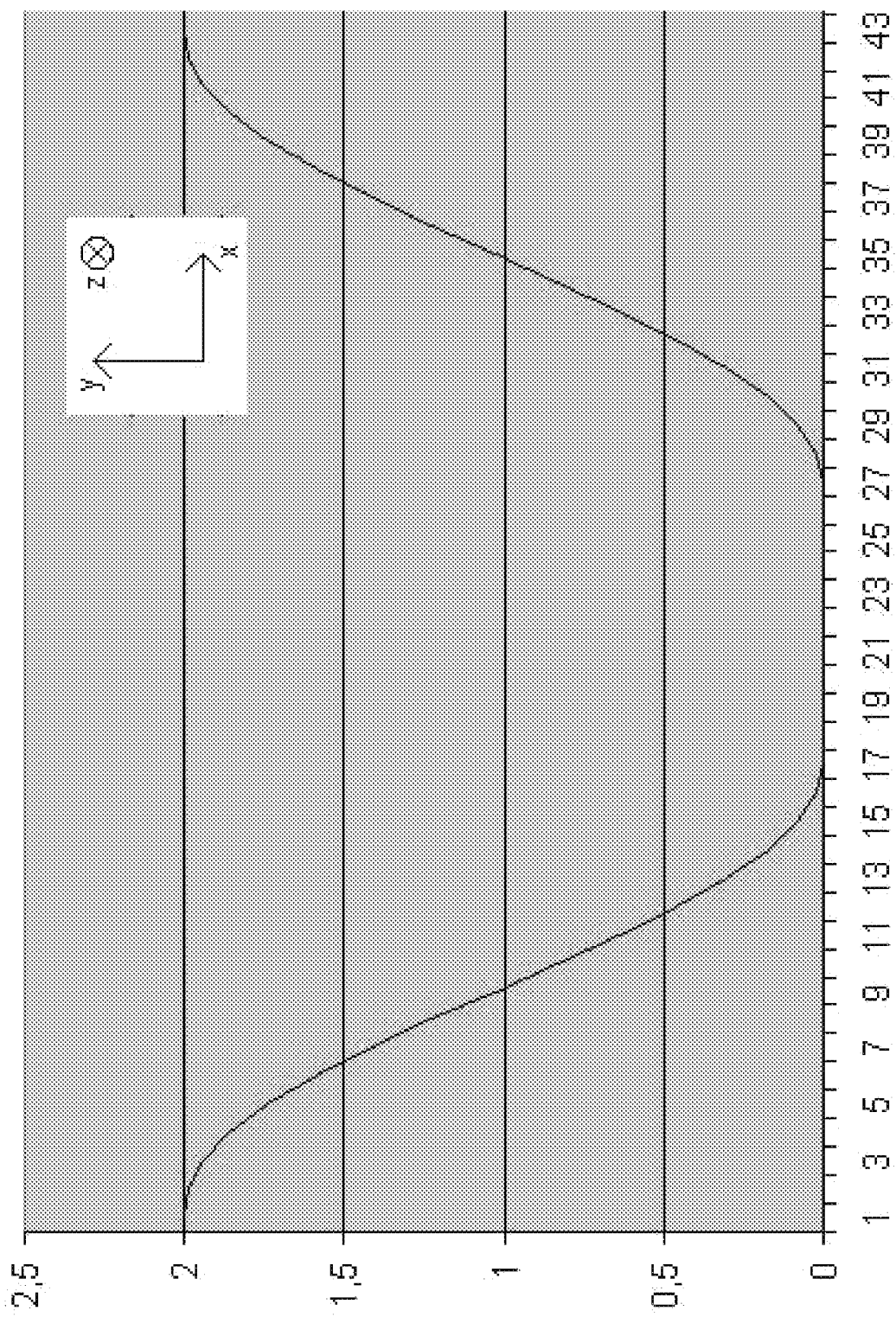
FIG. 11 is a plot of a cosine function with its minimum stretched by a discontinuous section which becomes used as a hull curve of image projection planes of a multi-camera image processing and display system in accordance with the present invention (such as can be seen as a cross cut through the center of the 3D projection screen model)

In the previous example, a parabola with 2 in the exponent is chosen as the hull curvature (such as shown in FIG. 10). The invention is not to be limited to parabolic curvature dependencies of the image(s) mapping plane, but encompasses other at least partially continuous functions, such as a Cosine function (such as shown in FIG. 11), a circle's segment or a segment of a polynomial of any order or that like. Best results were achieved by selecting a function which emerges moderate at the beginning and then increases more and more rapidly as a function of '$\vec{s}'_y$' and 'y'.

Figure 13:
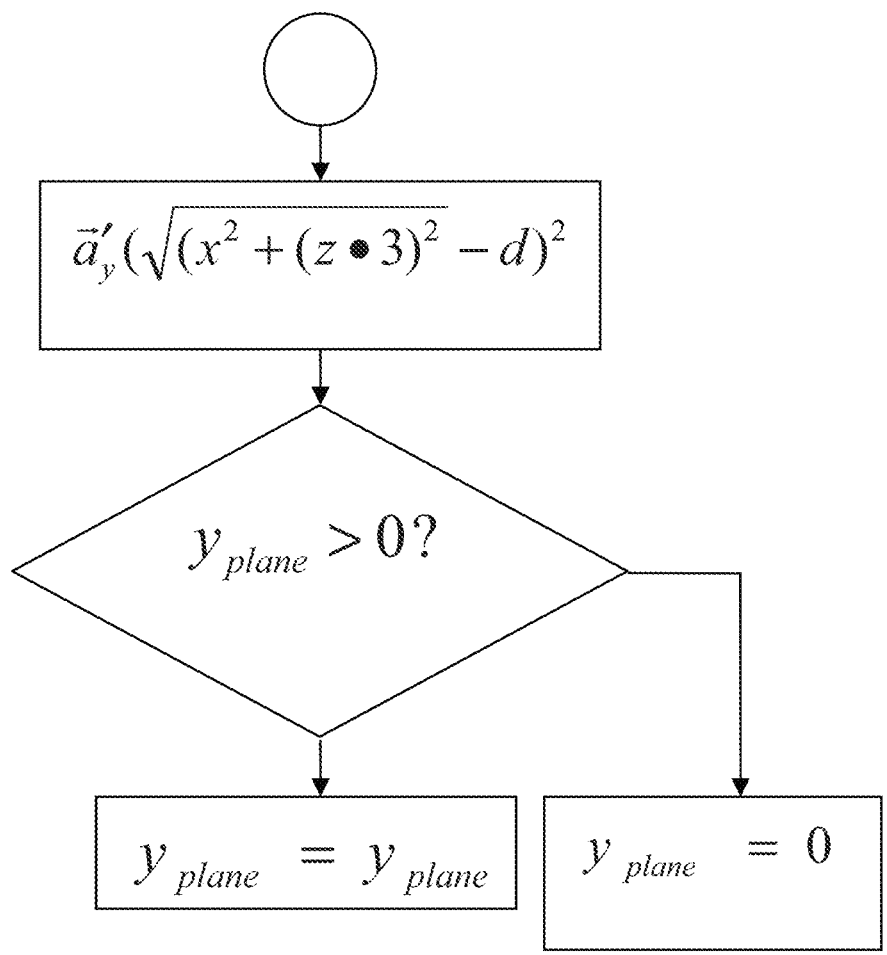
FIG. 13 is a schematic of an algorithm of a square parabola curvature function having a discontinuous section in the center and generating the hull curve for the image projection plane of a multi-camera image processing and display system for vehicles in accordance with the present invention.

There is a flat (x-z plane) area in the center in the shape of an oval in which the virtual vehicle may be mapped, given by the equation ($\sqrt{(x^2+(z\bullet3)^2}-d)$ in the example above. This is according the assumption that the vehicle always stands on the ground which is assumed to be mostly flat. At times the vehicle is disposed or located at or on sloped ground, and the whole coordinate system of the virtual top view may also be tilted in the same manner as much the vehicle is tilted. The free chosen factor 3 of the z coordinate in that equation is stretching the projection room into length (z) direction. An exemplary section of the vision system's algorithm generating the three dimensional projection plane space model according the above is shown in FIG. 13.

An alternative algorithm with similar results may be an algorithm that is operable to scale the size of the 3D-bowl shape like the virtual projection plane depending on the vertical component of the virtual camera's viewing angle instead of bending projection plane's curvature.

Figure 12:
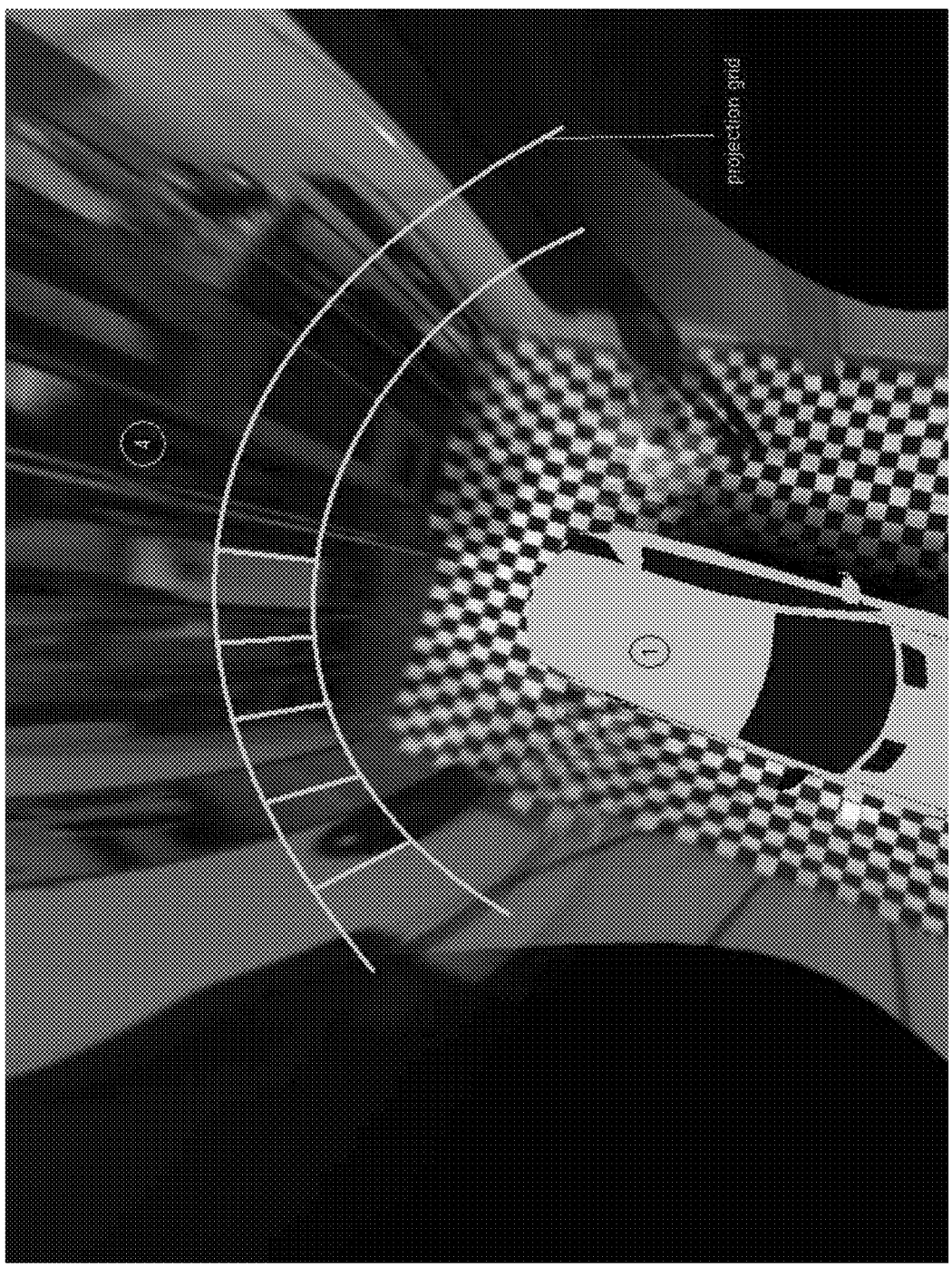
FIG. 12 is an angular top down view into a parabolic bowl shape screen on which a section of stitched camera images of a four camera 360 degree image processing and display system is projected in accordance with the present invention.

To map the stitched camera images to the projection plane, the plane is divided up into rectangles. In the above example, these are three times longer than wide when the virtual camera is looking top down (y component=0). At times when the virtual camera turns more horizontal (1>y>0), the projection plane's edges rise faster than the plane's borders. The mapped rectangles turn into uneven squares (such a marked as 'projection grid' in FIG. 12). There may be the limitation that the virtual camera's viewing angle cannot be risen above or substantially above the horizontal view.

Multi-Camera Image Processing System with Optimized Memory Access Patterns:

Current multi camera vision systems from several vendors like normally use image sensors that deliver raw Bayer-pattern images (with adjacent pixels of the imaging array sensing different colors). These images are then processed with an algorithm that is called "de-mosaicing" (such as at 1 in FIG. 5) to convert them into RGB, YUV or YCrCb color space or the like. Next to this conversion, several visibility enhancements 2 like gamma correction, tone mapping, color correction, white balance correction or brightness, contrast, saturation and exposure correction could be performed on these individual images to further enhance the images for viewing by the driver of the subject or equipped vehicle.

Such pre-processing steps can be performed either on the imager-chip, the camera or the main processing unit or any combination thereof. The pre-processed data may be further processed by an image composer 3 (such as for "stitching" of images to form a merged composite image from output image data from two or more cameras). The processed images or image data is then stored in a memory device at 4, such as the main memory of the main processing unit of the imaging and display system. Afterwards, the images are read back from memory at 5 and are processed to form a new combined output image that then again is being written back to the main memory so it can be used for displaying images and/or information for viewing by the driver of the vehicle. A potential drawback of such a processing method is that the pre-processing of the original raw Bayer-pattern images increases their size up to a factor of three or thereabouts. When combining the pre-processed images into a new one, a random memory access pattern can occur that, in conjunction with the increased data amount of the pre-processed images, may lead to congestion of the memory system and may thereby affect the overall system performance.

The present invention provides a processing system or approach that stores the original Bayer-pattern raw images in the main memory to reduce the amount of data to be moved to memory so the amount of data to be moved is as low as possible. To avoid random access patterns, only complete source blocks of a certain size of every original image are fetched by an image processing unit. The image processing unit processes these blocks directly by applying the pre-processing steps only to the fetched blocks. All further geometrical transformations and/or combination techniques are also applied only to these source blocks directly on the image processing unit. The resulting image block is then transferred back to main memory to form a part of the newly created destination image. By following this scheme, little or no random and/or near-random access patterns are generated and the data transferred from and to main memory is kept to an absolute minimum.

Figure 6:
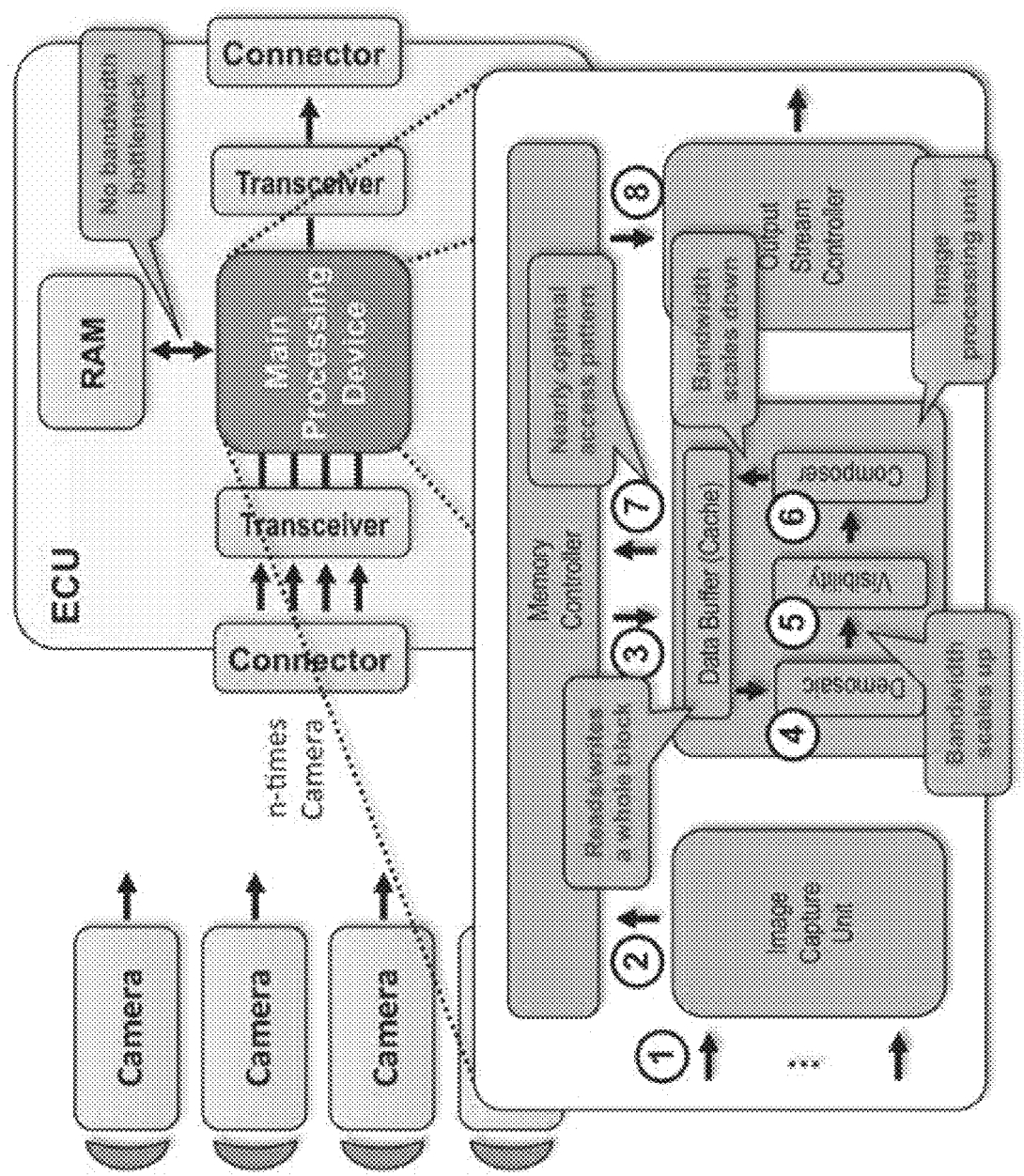
FIG. 6 is a schematic of a multi-camera image processing system for processing image data captured by multiple cameras at a vehicle in accordance with the present invention.

As shown in FIG. 6, raw Bayer-pattern image data streams are captured by a capture unit 1 and stored into main memory 2. The process of capturing images itself may involve a data conversion and interpretation of a complex video data stream or may comprise a simple capturing of simple raw image data in an arbitrary format, depending on the particular application and components of the imaging system. Optionally, the image capture unit might already alter this image data to form adjacent blocks of a certain size in memory or may simply copy the incoming data to memory without modifying the data word order. An image processing unit reads concurrent data blocks of a certain size from main memory at 3, thereby optionally storing them in an internal cache memory. These source image blocks are then processed by, but not limited to, these steps or this order, a de-mosaicing step 4 and a visibility enhancement step 5 (which may include but is not limited to color space conversion, gamma correction, tone mapping, color correction, white balance correction or brightness, contrast, saturation and exposure correction or any combination thereof). Finally, these pre-processed source blocks may be, without being limited to, geometrically transformed, modified in size, merged, blended together and/or with an alpha channel value, chroma keyed or combined in any arbitrary combination thereof via a composer 6. The newly created resulting image block is then written back into main memory at 7. This may be performed or achieved by writing the image block to some form of cache memory that may or may not be identical to the already mentioned cache memory and then later writing back this cache memory on an optimal point in time (write back), by simultaneously writing the image block to the mentioned cache memory and the main memory (write through), or by simply bypassing the mentioned cache memory and writing the image block directly to main memory.

By applying a scheme that yields a distinct resulting image block for every part of the final combined image, the memory bandwidth and access pattern nears the theoretical optimum. Finally, the combined image might be used to create an output image 8 either by, but not limited to, reading back the whole image from memory and outputting it directly on some sort of image output port or by converting it into any other video output stream by some form of output stream controller.

Figure 7:
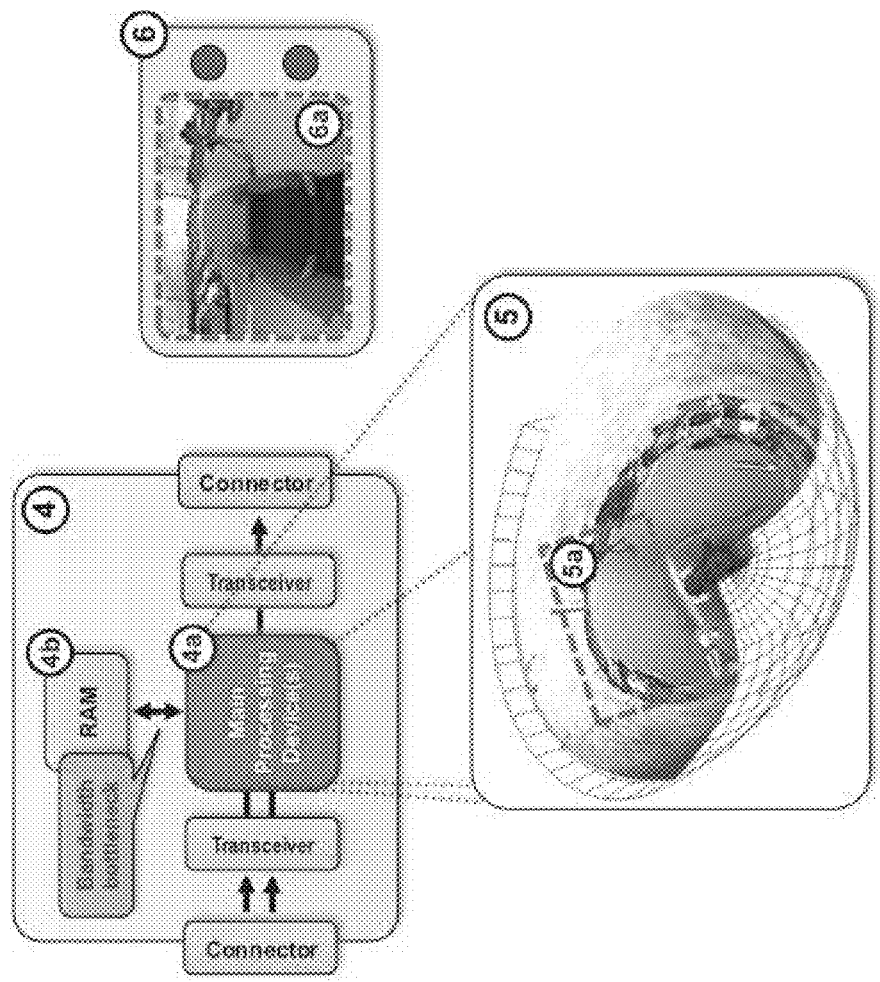
FIG. 7 is a schematic of a multi-camera image processing and display system for displaying images of the subject vehicle and/or its surroundings.
Figure 7:
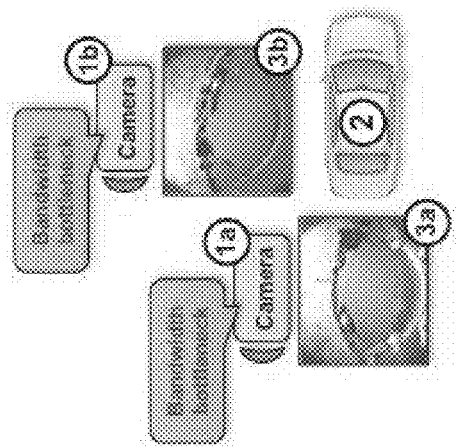

Surveillance System with Adaptive Reduction of Camera Data:

Current multi-camera surveillance systems for automotive applications have a common working principle. With reference to FIG. 7, at least two cameras 1a, 1b are mounted at a vehicle 2 so that the images they produce 3a, 3b depict a representation of the vehicle's surroundings. The cameras 1a, 1b are connected to an image processing system 4 that reads in the images or image data, stores them in memory 4b and processes them by means of one or more main processing devices 4a. To produce a more realistic view of the vehicle surroundings, a geometrical transformation 5, including optional merging of the images, is done and a part of the transformed image or images 5a is transmitted to an output device 6 (such as, for example, a display screen in the vehicle, such as at or near or in an interior rearview mirror assembly of the vehicle or a head unit with a display screen or the like), where it is displayed 6a.

Because the cameras 1a, 1b may be equipped with light sensors with a high resolution, a considerable bandwidth may be needed to transfer the images 3a, 3b to the image processing system 4. In order to transfer such amounts of data, highly sophisticated transfer mechanisms are typically used and such transfer mechanisms are becoming more expensive the more data has to be transmitted. The same applies to the interface between the main processing devices 4a and the main memory devices 4b. The more data to be stored, the more memory is needed to store the captured images and/or image data and/or processed data.

Figure 8:
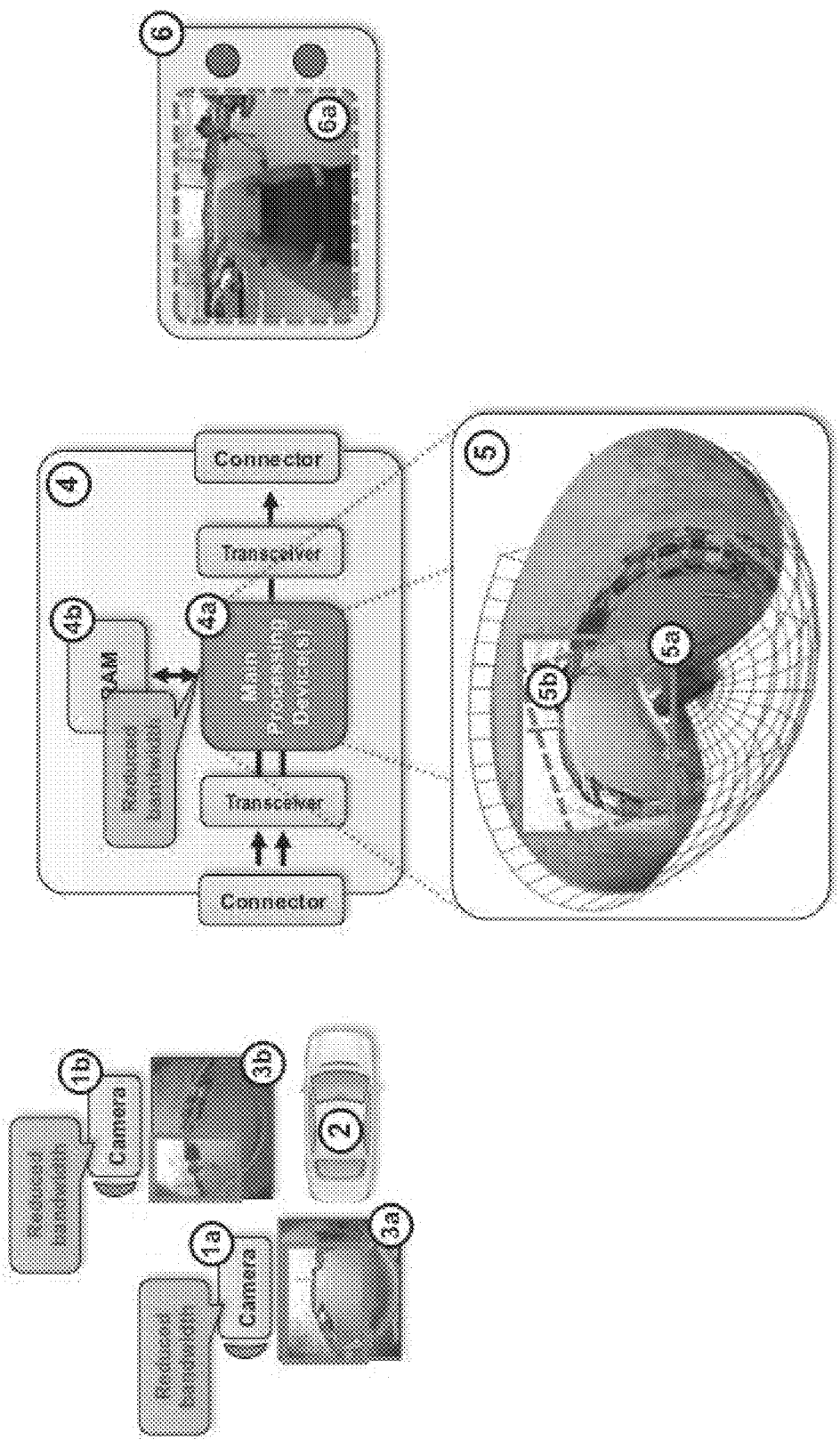
FIG. 8 is another schematic of a multi-camera image processing and display system for displaying images of the subject vehicle and/or its surroundings, shown with a merged display image in accordance with the present invention.

In order to overcome the potential concerns with such working principles for automotive multi-camera systems, the present invention provides (and with reference to FIG. 8) a system with at least two cameras 1a, 1b mounted on a vehicle 2 so that the images they produce 3a, 3b depict a representation of the vehicle's surroundings. By means of a back-communication channel, at least one of a set of defined regions of those images (instead of the full captured image or picture) can be selected to be transmitted by each camera. The set of defined regions are allowed to intersect and do not have to be distinct parts of the image. Furthermore, the system may independently set the resolution of those image areas to be transmitted, thus allowing the cameras to transmit parts of the image or the full image in the original resolution or with a down-scaled resolution.

The cameras 1a, 1b are connected to an image processing system 4 that reads in the transmitted image regions, stores them in memory 4b and processes them by means of one or more main processing devices 4a, but the system is not limited to that order. To produce a more realistic view of the surroundings, at least one geometrical transformation 5, including optional merging of the aforementioned image regions 3a, 3b may be done (such as shown at 5a in FIG. 8) and at least one selectable part of the transformed image regions 5b may be transmitted to an output device 6 (such as, for example, a display screen in the vehicle, such as at or near or in an interior rearview mirror assembly of the vehicle or a head unit with a display screen or the like), where the image is displayed 6a. If another part of the transformed image regions 5b is to be displayed that requires image data outside of the merged image regions 5a or requires another set of source image regions 3a, 3b, a new set of region parameters may be calculated or fetched from a pre-calculated set of parameters, and new source image regions 3a, 3b may be requested via the aforementioned back-channel from the set of cameras 1a, 1b. This operation scheme reduces the required bandwidth of the data from the cameras 1a, 1b to the image processing system 4, thereby allowing for less costly connections of the cameras. Likewise, the same may apply to the memory system 4b and its connection to the main processing devices 4a by allowing for a reduced memory size or a simplified connection method with a lower bandwidth.

Figure 9:
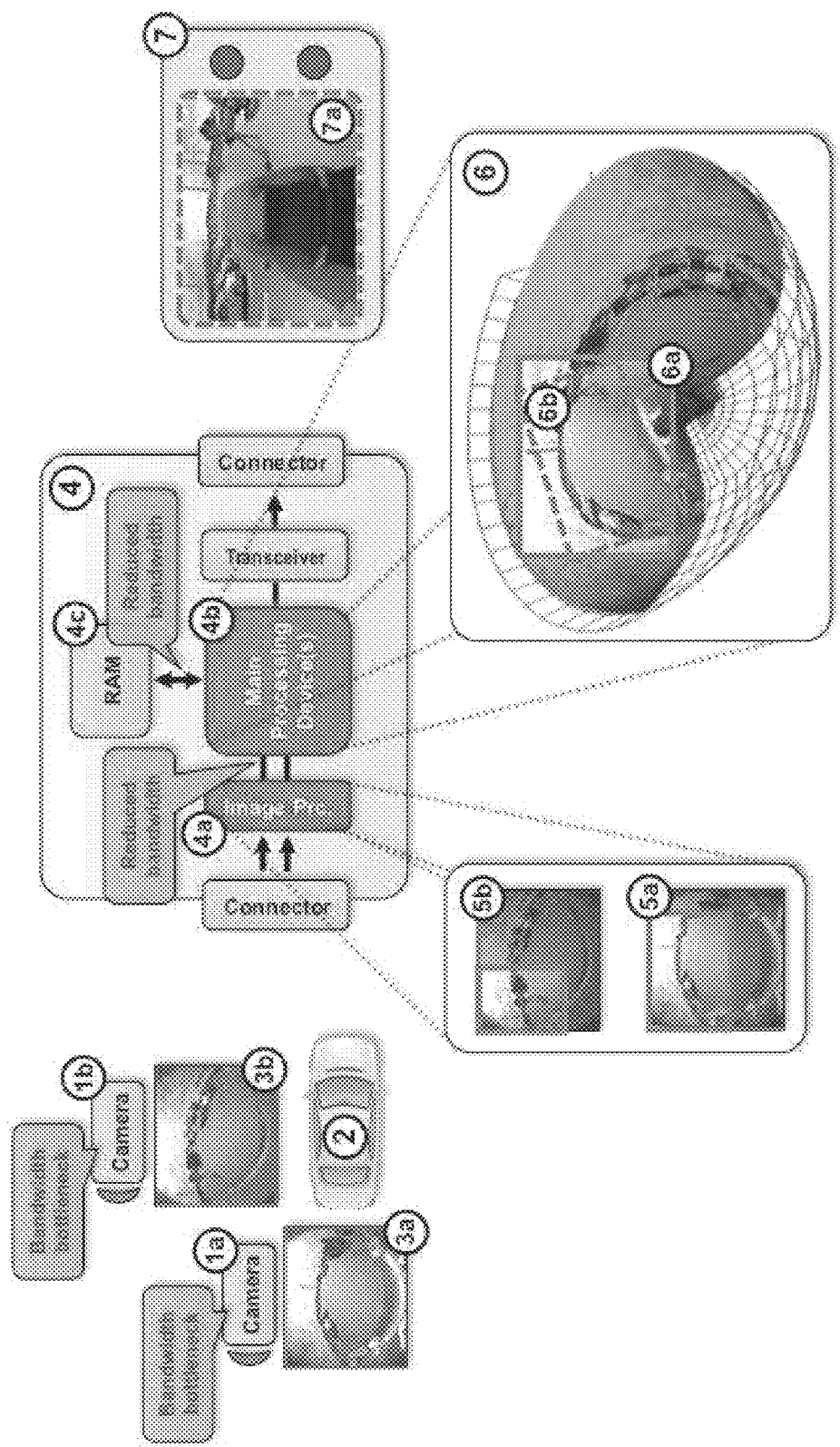
FIG. 9 is another schematic of a multi-camera image processing and display system for displaying images of the subject vehicle and/or its surroundings, shown with a merged display image in accordance with the present invention.

Optionally, a feature-reduced version (FIG. 9) may be implemented by introducing an image pre-processing device 4a that allows for the image region selection features even if the cameras can only transmit full images without being able to select a set of image regions with selectable resolutions. Such an image pre-processing device may comprise a separate device or may be included in the main processing device or devices 4b. Such a feature-reduced version may not reduce the bandwidth of the camera connection but still provides a reduction of the needed memory size and bandwidth.

Therefore, the present invention provides an imaging system that provides for reduced bandwidth requirements and, thus, provides an imaging system with reduced cost and enhanced performance. The system of the present invention thus provides an enhanced processing system that is operable to process image data into a three-dimensional space model for display at a display screen, and provides an improvement over the likes of the image processing systems described in U.S. Pat. No. 7,161,616, which is hereby incorporated herein by reference in its entirety.

The imaging sensor and its photosensor array may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns.

The logic and control circuit of the imaging sensor may function in any known manner, such as in the manner described in U.S. Pat. Nos. 5,550,677; 5,877,897; 6,498,620; 5,670,935; 5,796,094; 6,396,397, and/or U.S. patent application Ser. No. 13/534,657, filed Jun. 27, 2012, and/or U.S. provisional application Ser. No. 61/666,146, filed Jun. 29, 2012; Ser. No. 61/653,665, filed May 31, 2012; Ser. No. 61/653,664, filed May 31, 2012; Ser. No. 61/650,667, filed May 23, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570,017, filed Dec. 13, 2011; Ser. No. 61/568,791, filed Dec. 9, 2011; Ser. No. 61/567,446, filed Dec. 6, 2011; Ser. No. 61/559,970, filed Nov. 15, 2011; Ser. No. 61/552,167, filed Oct. 27, 2011; Ser. No. 61/540,256, filed Sep. 28, 2011; and/or Ser. No. 61/513,745, filed Aug. 1, 2011, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, and/or U.S. provisional application Ser. No. 61/567,150, filed Dec. 6, 2011; Ser. No. 61/565,713, filed Dec. 1, 2011; and/or Ser. No. 61/537,279, filed Sep. 21, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009, and published Jan. 28, 2010 as U.S. Pat. Publication No. US 2010-0020170, and/or U.S. patent application Ser. No. 13/534,657, filed Jun. 27, 2012 and published Jan. 3, 2013 as U.S. Publication No. US-2013-0002873, which are hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. No. 8,542,451, and/or U.S. Pat. Nos. 7,965,336 and 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the display of the vision system may display images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety). As discussed above, the vision system (utilizing a forward and/or rearward facing camera and other cameras disposed at the vehicle with exterior fields of view) comprises and utilizes a plurality of cameras (such as utilizing a rearward facing camera and sidewardly facing cameras and a forwardly facing camera disposed at the vehicle), and provides a display of a top-down view or birds-eye view of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US11/62834, filed Dec. 1, 2011 and published Jun. 7, 2012 as International Publication No. WO 2012-075250, and/or U.S. patent application Ser. No. 13/333,337, filed Dec. 21, 2011, now U.S. Pat. No. 9,264,672, and/or U.S. provisional application Ser. No. 61/615,410, filed Mar. 26, 2012; Ser. No. 61/588,833, filed Jan. 20, 2012; Ser. No. 61/570,017, filed Dec. 13, 2011; Ser. No. 61/568,791, filed Dec. 9, 2011; Ser. No. 61/559,970, filed Nov. 15, 2011; Ser. No. 61/540,256, filed Sep. 28, 2011, which are hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,338,177; 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

The display or displays may comprise a video display and may utilize aspects of the video display devices or modules described in U.S. Pat. Nos. 6,690,268; 7,184,190; 7,274,501; 7,370,983; 7,446,650 and/or 7,855,755, and/or U.S. patent application Ser. No. 10/538,724, filed Jun. 13, 2005 and published Mar. 9, 2006 as U.S. Publication No. US-2006-0050018, which are all hereby incorporated herein by reference in their entireties. The video display may be operable to display images captured by one or more imaging sensors or cameras at the vehicle.

Changes and modifications to the specifically described embodiments may be carried out without departing from the principles of the present invention, which is intended to be limited only by the scope of the appended claims as interpreted according to the principles of patent law.

The invention claimed is:

1. A method for generating surround view images derived from image data captured by cameras of a vehicular surround view vision system, the method comprising:

equipping a vehicle with a plurality of cameras disposed at the vehicle, each having a respective exterior field of view;

providing a control at the vehicle, the control comprising an image processor;

capturing image data via cameras of the plurality of cameras and providing captured image data to the control;

processing via the image processor of the control the provided captured image data to generate a first three-dimensional representation in accordance with a first curved surface model as if seen by a virtual observer from a first virtual viewing point exterior of the vehicle having a first viewing direction;

outputting to a display screen of the vehicle from the control the first three-dimensional representation for display at the display screen for viewing of the first three-dimensional representation by a driver of the vehicle;

responsive to actuation of a user input by the driver of the vehicle, (i) adjusting processing by the image processor of the control of the provided captured image data to generate a second three-dimensional representation in accordance with a second curved surface model as if seen by a virtual observer from a second virtual viewing point exterior of the vehicle having a second viewing direction, and (ii) outputting to the display screen from the control the second three-dimensional representation for display at the display screen for viewing of the first three-dimensional representation by the driver of the vehicle; and wherein the first and second curved surface models each comprise a virtual surface around the vehicle, and wherein each virtual surface has respective surface curvature, and wherein the surface curvature of the virtual surface of the second curved surface model is different from the surface curvature of the virtual surface of the first curved surface model.

2. The method of claim 1, wherein actuation of the user input by the driver of the vehicle comprises selection by the driver of the second virtual viewing point.

3. The method of claim 2, wherein actuation of the user input by the driver of the vehicle comprises selection by the driver of the second viewing direction.

4. The method of claim 1, wherein the first virtual viewing point is generally above the vehicle and the first viewing direction is horizontal and the first curved surface model has curved virtual surfaces around the vehicle, and wherein the second virtual viewing point is generally above the vehicle and the second viewing direction is vertically downward towards the top of the vehicle, and wherein the control adjusts the second curved surface model to have planar virtual surfaces for displaying at the display screen the second three-dimensional representation from the second virtual viewing point.

5. The method of claim 4, wherein surface curvature of the virtual surfaces of the first and second curved surface models are adjusted by the control depending on a vertical (y) component of the second virtual viewing direction.

6. The method of claim 5, wherein the dependency of the vertical (y) component of the second virtual viewing direction is linear.

7. The method of claim 5, wherein the dependency of the vertical (y) component of the second virtual viewing direction is exponential.

8. The method of claim 4, wherein a curve characteristic of the surface curvature of each of the first and second curved surface models is given by an at least partially continuous function.

9. The method of claim 8, wherein the at least partially continuous function has one static area and at least one exponential area.

10. The method of claim 8, wherein the at least partially continuous function has one static area and at least one cosine area.

11. The method of claim 8, wherein the at least partially continuous function has one static area and at least one polynomial area.

12. The method of claim 1, wherein the display screen is disposed at one selected from the group consisting of (i) an interior rearview mirror assembly of the vehicle and (ii) a head unit assembly of the vehicle.

13. The method of claim 1, wherein the display screen comprises a video mirror display screen, and wherein video information displayed at the display screen is viewable through a transflective mirror reflector of a mirror reflective element of an interior rearview mirror assembly of the vehicle.

14. The method of claim 1, wherein the plurality of cameras comprise (i) a rearward viewing camera, (ii) a left-side sideward viewing camera, (iii) a right-side sideward viewing camera and (iv) a forward viewing camera.

15. A method for generating surround view images derived from image data captured by cameras of a vehicular surround view vision system, the method comprising:

equipping a vehicle with a plurality of cameras disposed at the vehicle, the plurality of cameras at least comprising (i) a rearward viewing camera disposed at the vehicle, (ii) a left-side sideward viewing camera disposed at the vehicle, (iii) a right-side sideward viewing camera disposed at the vehicle and (iv) a forward viewing camera disposed at the vehicle;

providing a control at the vehicle, the control comprising an image processor;

capturing image data via cameras of the plurality of cameras and providing captured image data to the control;

processing via the image processor of the control the provided captured image data to generate a first three-dimensional representation in accordance with a first curved surface model as if seen by a virtual observer from a first virtual viewing point exterior of the vehicle having a first viewing direction;

outputting to a display screen of the vehicle from the control the first three-dimensional representation for display at the display screen for viewing of the first three-dimensional representation by a driver of the vehicle;

responsive to actuation of a user input by the driver of the vehicle, (i) adjusting processing by the image processor of the control of the provided captured image data to generate a second three-dimensional representation in accordance with a second curved surface model as if seen by a virtual observer from a second virtual viewing point exterior of the vehicle having a second viewing direction, and (ii) outputting to the display screen from the control the second three-dimensional representation for display at the display screen for viewing of the first three-dimensional representation by the driver of the vehicle;

wherein actuation of the user input by the driver of the vehicle comprises selection by the driver of at least one selected from the group consisting of (i) the second virtual viewing point and (ii) the second viewing direction; and wherein the first and second curved surface models each comprise a virtual surface around the vehicle, and wherein each virtual surface has respective surface curvature, and wherein the surface curvature of the virtual surface of the second curved surface model is different from the surface curvature of the virtual surface of the first curved surface model.

16. The method of claim 15, wherein the first virtual viewing point is generally above the vehicle and the first viewing direction is horizontal and the first curved surface model has curved virtual surfaces around the vehicle, and wherein the second virtual viewing point is generally above the vehicle and the second viewing direction is vertically downward towards the top of the vehicle, and wherein the control adjusts the second curved surface model to have planar virtual surfaces for displaying at the display screen the second three-dimensional representation from the second virtual viewing point.

* * * * *